US008844430B2

(12) United States Patent
Mastropasqua et al.

(10) Patent No.: US 8,844,430 B2
(45) Date of Patent: Sep. 30, 2014

(54) FILTER HOLDER PARTICULARLY FOR ESPRESSO COFFEE MACHINES

(75) Inventors: Luca Mastropasqua, Trieste (IT); Bruno Dellapietra, Duino Aurisina (IT); Frans Van Eeden, Milan (IT)

(73) Assignee: Illycaffe' S.p.A. (IT)

( * ) Notice: Subject to any disclaimer, the term of this patent is extended or adjusted under 35 U.S.C. 154(b) by 488 days.

(21) Appl. No.: 11/912,742

(22) PCT Filed: Apr. 27, 2006

(86) PCT No.: PCT/EP2006/061867
§ 371 (c)(1),
(2), (4) Date: Oct. 26, 2007

(87) PCT Pub. No.: WO2006/117321
PCT Pub. Date: Nov. 9, 2006

(65) Prior Publication Data
US 2009/0266238 A1    Oct. 29, 2009

(30) Foreign Application Priority Data
Apr. 29, 2005  (IT) .............. MI2005A0787

(51) Int. Cl.
*A47J 31/06* (2006.01)
*A47J 31/36* (2006.01)
(52) U.S. Cl.
CPC .......... *A47J 31/3685* (2013.01); *A47J 31/0663* (2013.01); *A47J 31/0668* (2013.01)
USPC ...................... 99/302 R; 99/289 R
(58) Field of Classification Search
CPC  A47J 31/0663; A47J 31/3685; A47J 31/0668

USPC ............... 99/330, 451, 289, 290, 289 R, 295, 99/302 R; 426/77
See application file for complete search history.

(56) References Cited

U.S. PATENT DOCUMENTS

| 4,429,623 | A | | 2/1984 | Illy et al. |
| 5,265,517 | A | | 11/1993 | Gilbert |
| 5,473,973 | A | * | 12/1995 | Cortese ........................... 99/295 |
| 6,021,706 | A | | 2/2000 | Seguenot et al. |
| 6,854,378 | B2 | | 2/2005 | Jarisch et al. |
| 6,857,355 | B2 | * | 2/2005 | Rolland ..................... 99/302 R |
| 7,591,217 | B2 | * | 9/2009 | Kodden et al. .............. 99/302 R |
| 2004/0118290 | A1 | | 6/2004 | Cai |

FOREIGN PATENT DOCUMENTS

| EP | 0070403 A1 | 1/1983 |
| EP | 0 449 792 | 10/1991 |

(Continued)

OTHER PUBLICATIONS

International Search Report; PCT/EP2006/061867; Oct. 9, 2006.

*Primary Examiner* — Jianying Atkisson
(74) *Attorney, Agent, or Firm* — Cantor Colburn LLP

(57) ABSTRACT

A filter holder particularly for espresso coffee machines, comprising a cup-shaped body (2) which has a substantially cylindrical shape with respect to an axis (3), the body (2) being open in an upward region for watertight fitting on an espresso coffee machine and having an opening (5) on its bottom which is arranged on the axis (3) of the cup (2) for the passage of an extracted beverage, the filter holder comprising an adapter (8), which is fitted in the cup (2) and is substantially cylindrical in order to accommodate a substance in powder form from which a beverage is to be extracted, the adapter (8) being able to rotate coaxially with respect to the cup (2).

16 Claims, 4 Drawing Sheets

(56) References Cited

FOREIGN PATENT DOCUMENTS

| | | |
|---|---|---|
| EP | 0 555 775 | 8/1993 |
| EP | 838185 A1 * | 4/1998 |
| EP | 1 576 912 | 9/2005 |
| EP | 1 580 144 | 9/2005 |
| EP | 1580144 A1 * | 9/2005 |
| WO | WO 0207576 A1 * | 1/2002 |
| WO | WO 03055366 A2 * | 7/2003 |

* cited by examiner

FILTER HOLDER PARTICULARLY FOR ESPRESSO COFFEE MACHINES

TECHNICAL FIELD

The present invention relates to a filter holder particularly for espresso coffee machines and to an extraction assembly which comprises said filter holder.

BACKGROUND ART

Conventional espresso coffee machines, used in dining places or at home, typically comprise a boiler assembly provided with a pump for generating pressurized hot water and an extraction assembly, by means of which the hot water is injected into an infusion chamber in order to extract a beverage from a substance in particulate form, typically ground roasted coffee.

The extraction chamber is formed through a filter holder, i.e., a body which is typically metallic or made of chromium-plated material and is cup-shaped in order to contain a filter, into which a dose of ground coffee is poured; the body is provided with a handle for engaging and disengaging the filter holder on the extraction assembly. The dose of ground coffee can be loose or enclosed in a tablet or pod composed of two layers of filter paper or filtering fabric which are connected to each other, for example a pod according to the E.S.E.® (Easy Serving Espresso) standard or a rigid cartridge or any other type of prepackaged dose suitable for preparing hot beverages.

The base of the filter holder has an opening in a substantially central position in order to allow the outflow of the extracted beverage. At this opening there is a spout with one or more outlets for conveying the extracted beverage into one or more cups.

The operations for engaging and disengaging the filter holder often entail friction between the internal surface of the filter-filter holder assembly and the internal elements of the extraction assembly, which cooperate with said internal surface in order to form an extraction or infusion chamber.

For example, a machine of a known type is provided with an extraction assembly which has a fixed O-Ring gasket, which acts radially on the internal surface of the side wall of the filter holder in order to ensure the hydraulic tightness of the extraction chamber. The movements for fitting and removing the filter holder with respect to the extraction assembly, which are performed every time the beverage is prepared, entail the friction of said internal surface against the gasket, causing its early wear or even its removal from its seat.

A particular known extraction assembly, fitted on machines known as "X1 by appointment" marketed by FrancisFrancis and comprising a gasket used as described above, provides, in addition to the traditional operations for fitting and removing the filter holder, the possibility to choose the mode of extraction of the beverage by varying the height of the extraction chamber by turning the filter holder about its own axis.

The bayonet coupling between the filter holder and the ring of the extraction assembly in fact allows to move the filter holder gradually closer to the hot water injector, varying the axial distance between the coffee pod and the hot water nozzle. The shorter this distance, the higher the hydraulic resistance of the cake of ground coffee, obtaining in output a so-called "ristretto" (strong) coffee. Conversely, a greater distance between the nozzle and the coffee pod reduces the hydraulic resistance of the pod, allowing to obtain a so-called "lungo" (weak) coffee in a time which is compatible with the normal use of the machine, avoiding the negative effect of "overextraction" of the beverage.

In this known extraction assembly, the fine adjustment of the rotation of the filter holder is important in order to be able to select the type of coffee to be extracted. Unfortunately, it has been found that the internal surface of the filter holder can slip on the gasket up to a maximum of approximately 20 mm of the length of said gasket before reaching the position suitable for preparing coffee.

This slippage, combined with the frequent rotations of the filter holder and with the high temperatures reached by the surface of the filter holder, entail rapid wear or breakage of the gasket and accordingly its frequent and inconvenient replacement.

Moreover, another drawback which is observed in espresso coffee machines is the friction between the filter holder and the gaskets or the internal walls of the extraction assembly with which the filter holder comes into contact. This friction often prevents easy removal of the filter holder from the extraction assembly at the end of beverage extraction, due also to small residues of beverage which may remain on the surfaces in contact.

DISCLOSURE OF THE INVENTION

The aim of the present invention is to obviate the drawbacks described above by providing a type of filter holder particularly for espresso coffee machines which facilitates the operations for engaging and disengaging it with respect to an extraction assembly.

Within this aim, an object of the invention is to provide a filter holder which reduces the friction problems that occur during said assembly and disassembly steps.

Moreover, the present invention has the additional object of minimizing the causes of the wear of the internal components of the extraction assembly, particularly of the gaskets that maintain the hydraulic seal of the infusion chamber.

Moreover, another object of the invention is to facilitate the removal of the filter holder from the extraction assembly at the end of the preparation of the beverage.

Still another object of the invention is to provide a filter holder which is highly reliable, relatively easy to provide and at competitive costs.

This aim and these and other objects, which will become better apparent hereinafter, are achieved by a filter holder particularly for espresso coffee machines, which comprises a cup-shaped body which has a substantially cylindrical shape with respect to an axis, said body being open in an upward region for fitting on an espresso coffee machine and having an opening on its bottom which is arranged on the axis of the body for the passage of an extracted beverage, characterized in that it comprises an adapter which is fitted in the cup-shaped body and is substantially cylindrical in order to accommodate a substance in powder form from which a beverage is to be extracted, the adapter being able to rotate coaxially with respect to the cup-shaped body.

The intended aim and objects are also achieved by an assembly for extracting a beverage from a substance in particulate form, characterized in that it comprises: a bell-shaped element, which has a base and a side wall which lies around an axis for fitting on a machine for extracting beverages; a ring, which is fitted coaxially and externally with respect to the bell-shaped element; a filter holder according to the invention, which is fitted removably on the ring with a bayonet coupling in order to form an extraction chamber together with at least one portion of the base of the bell-shaped element, the height of the extraction chamber being adjustable according to the angular position of the filter holder about the axis, the extraction chamber comprising a gasket which can engage, so as to form a radial seal, the surface of the adapter of the filter holder during the fitting and removal of the filter holder on the ring.

BRIEF DESCRIPTION OF THE DRAWINGS

Further characteristics and advantages of the invention will become better apparent from the description of a preferred but not exclusive embodiment of the filter holder according to the invention, illustrated by way of non-limiting example in the accompanying drawings, wherein.

WAYS OF CARRYING OUT THE INVENTION

Figure 1:
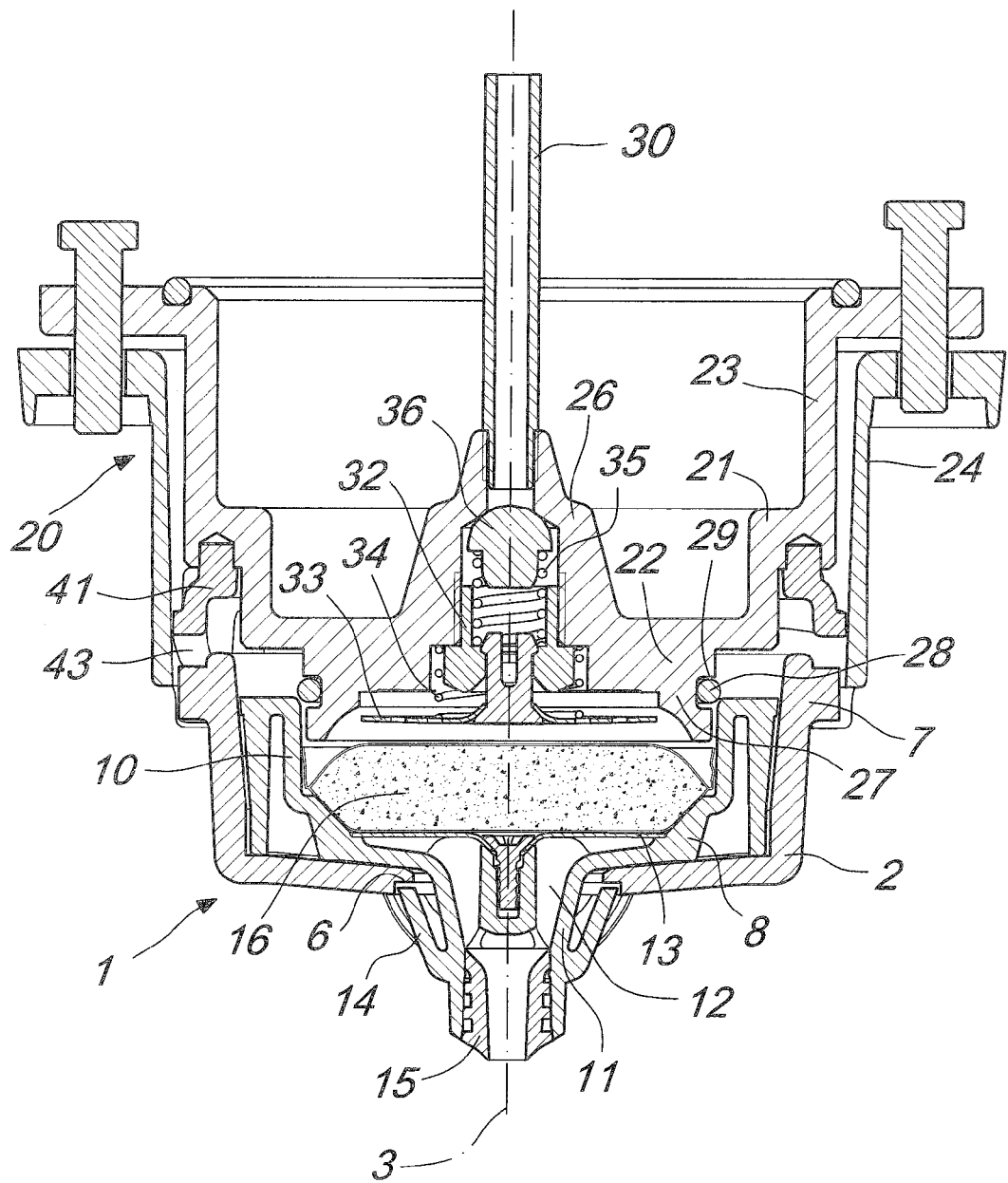
FIG. 1 is a radial sectional view of an extraction assembly which comprises the filter holder according to the invention in the initial coupling position.

With reference to the figures, the filter holder according to the invention, generally designated by the reference numeral 1, comprises a body 2, which is cup-shaped and is substantially cylindrical with respect to an axis 3. The body or cup 2, preferably made of metallic or chromium-plated material, has an upper opening 4, which is adapted to be engaged with an extraction assembly in order to form a watertight extraction chamber.

An opening 5 is provided in the base of the cup 2 and at the axis 3 and allows to form a passage between the beverage extraction chamber and a cup into which the extracted beverage is to be poured. Advantageously, on the rim of the opening 5 a groove 6 is provided, the function whereof will be described hereinafter.

The side wall of the body 2, which together with its base forms the cup-shape of the body 2, comprises two protrusions 7 in mutually opposite positions with respect to the axis 3, which are provided on the outer surface of the side wall of the body and are adapted to provide a bayonet coupling between the filter holder 1 and the ring of the extraction assembly.

The filter holder 1 comprises an adapter 8, which is fitted so that it can rotate within the cup 2 and also is substantially cylindrical around the axis 3. The adapter 8, preferably made of plastic material (for example polyphenylsulfone or polyetherimide) by way of molding techniques, comprises a base 9, from which a side wall 10 protrudes axially, forming a receptacle which is adapted to accommodate a dose of coffee, preferably in the form of a prepackaged pod 16, for example of the E.S.E.® type mentioned earlier.

In the illustrated embodiment, the height of the side wall 10 is substantially equal to, or in any case comparable to, the height of the cylindrical side wall 27 of the boiler body 21, so as to provide an internal surface of the adapter which cooperates with the extraction assembly so as to form an extraction or infusion chamber which does not comprise parts of the internal surfaces of the cup 2.

In the opposite position with respect to the direction of the extension of the wall 10, the adapter 8 further comprises a beverage conveyance element 11, which protrudes from the base 9 coaxially to the axis 3 in order to pass through the opening 5 of the cup 2 and forms a passage for the beverage from the receptacle toward the outside, preferably directly toward a small or regular cup. For this purpose, at the center of the base 9 openings 12 are provided, which are arranged around a central dead hole of the adapter, in which a screw is screwed in order to fix a circular filter 13, which is used to support the pod during extraction and to retain any granular residues of coffee inside the extraction chamber.

The adapter 8 is fixed rotatably to the cup 2 by way of means for blocking axial movement, which allow the free rotation of the adapter in the cup 2 about its axis 3 without preventing their mutual separation. The axial blocking means are preferably of the snap-fit type and comprise, in the illustrated embodiment, two tabs 14, which are provided monolithically on the external surface of the conveyance element 11 so that they have a free end which is directed toward the outside of the conveyance element and upwardly.

As an alternative, the axial blocking means can be spring-loaded pins arranged on the internal surface of the cup 2 or wings in which the free end is directed downwardly.

Although the tabs 14 are preferably made of the same substantially rigid material as the adapter 8, the low thickness of said tabs 14 makes them substantially flexible in a radial direction, so that when the adapter is inserted in the cup 2, the tabs or wings 14 move elastically closer in order to allow the passage of the conveyor 11 through the opening 5 of the cup 2 and move apart with a snap action once their free ends have passed beyond the rim of the opening 5.

Once fitted to the cup 2, the adapter is free to rotate about its own axis 3, and its movement in an axial direction is blocked by the free ends of the tabs 14, which engage against the base of the cup 2.

Advantageously, the free ends of the tabs 14 are accommodated in the groove 6 provided around the rim of the opening 5 of the cup 2 and slide in said groove during the rotation of the adapter in the cup 2. The groove 6 allows to avoid divarication of the tabs 14 as a consequence of the stress to which they are subjected during removal of the filter holder from the extraction assembly.

Optionally, the conveyance element 11 comprises an internal insert 15 for coupling the conveyance element to a spout (not shown in the figures) in order to divert in a radial direction the flow of extracted coffee and pour it into one or two cups.

Figure 2:
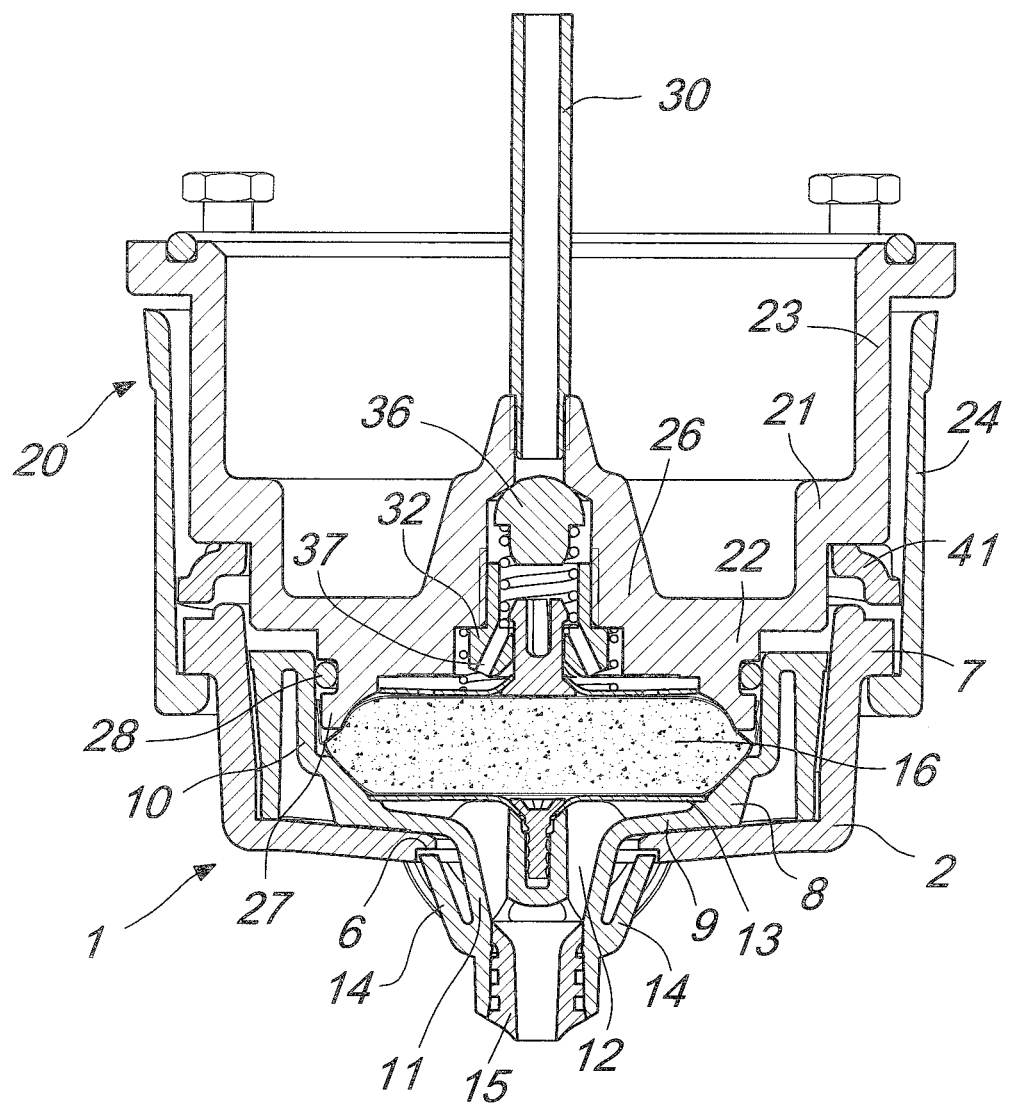
FIG. 2 is a radial sectional view of the extraction assembly of FIG. 1, with the filter holder in a position which is adapted to prepare a weak coffee.
Figure 3:
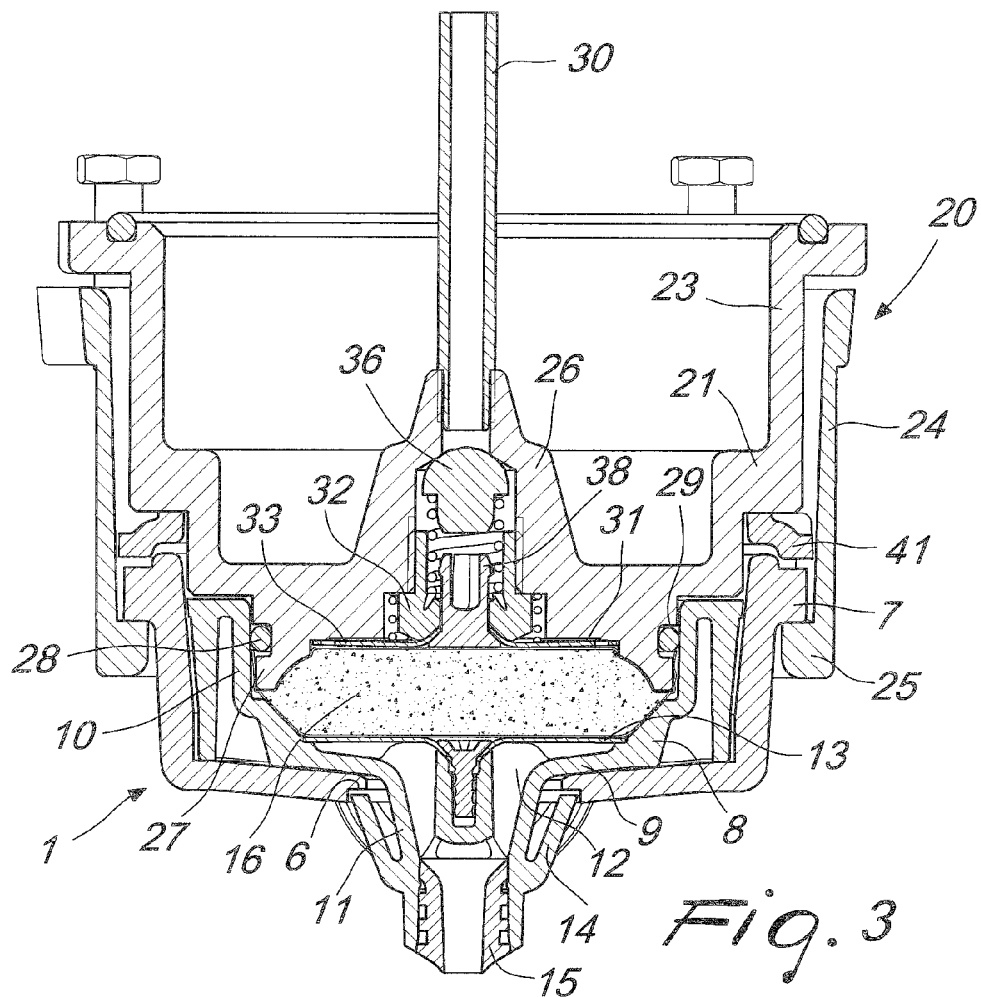
FIG. 3 is a radial sectional view of the extraction assembly of FIG. 1, with the filter holder in a position which is adapted to prepare a strong coffee.
Figure 4:
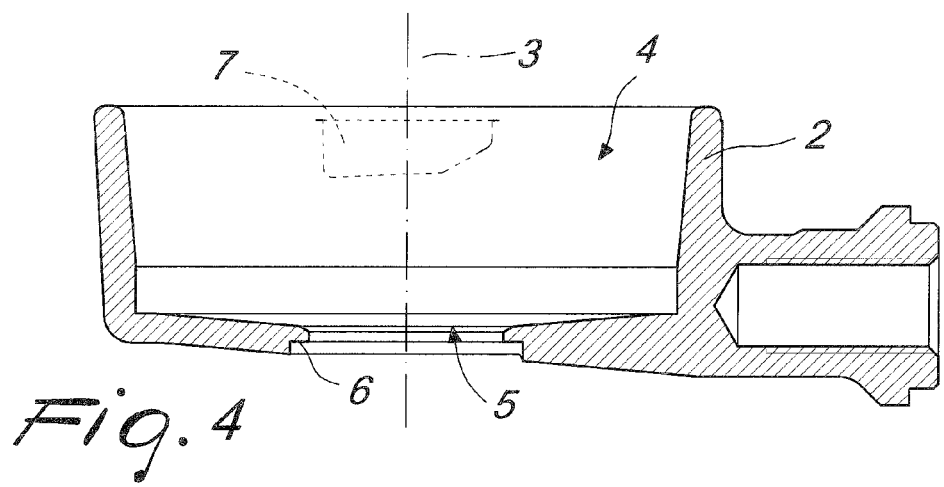
FIG. 4 is an axial sectional view of the filter holder without the adapter.
Figure 5:
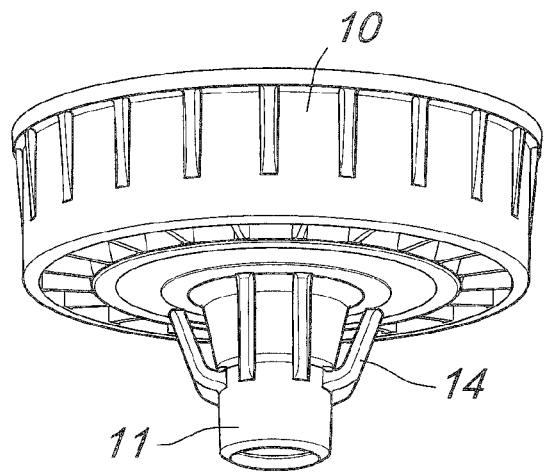
FIG. 5 is a bottom perspective view of the adapter of the filter holder according to the invention.
Figure 6:
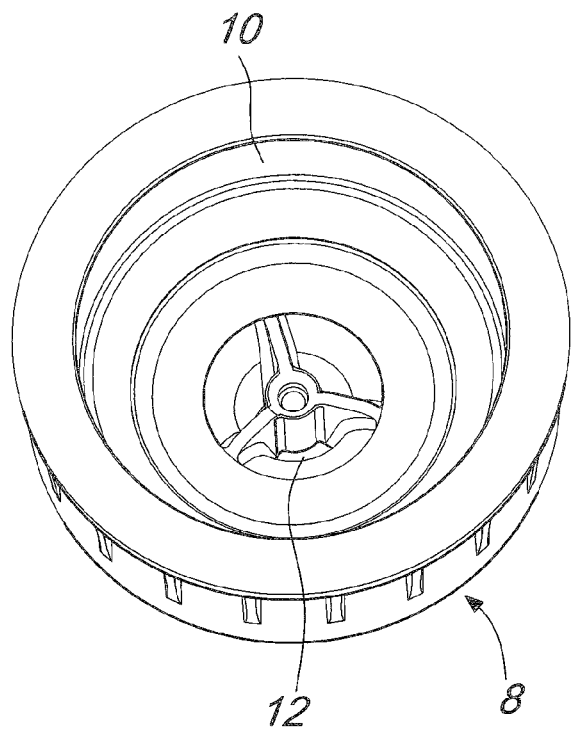
FIG. 6 is a top perspective view of the adapter of the filter holder according to the invention.

FIGS. 1 to 3 illustrate a particular extraction assembly, which incorporates the filter holder 1 according to the invention, fitted in three successive positions occupied by the filter holder. The cross-sections are taken along an axial plane which is rigidly coupled to the filter holder 1.

The extraction assembly, generally designated by the reference numeral 20, comprises a bell-shaped element 21, which is formed by a base 22 and by a side wall 23 which lies cylindrically around the axis 3.

A ring 24 is arranged coaxially and externally with respect to the bell-shaped element 21 and comprises, in its lower part, a guide 25 for the bayonet-like engagement of the filter holder 1 on the extraction assembly 20. In particular, the lower guide 25 has a helical configuration along a part which lies inside the ring 24, so as to provide a support for the protrusions 7 of the filter holder.

The bell-shaped element 21 and the ring 24 are arranged one inside the other and can be fitted on any assembly for dispensing pressurized hot water normally used in conventional espresso coffee machines, for example by means of screws as shown in FIG. 1.

The base 22 of the bell-shaped element 21 is shaped so as to comprise a hollow protrusion 26, which is coaxial to the axis 3 and is directed substantially toward the inside of the bell-shaped element 21 formed by the side wall 23, in order to engage an injector 30 of pressurized hot water.

Moreover, a second cylindrical wall 27 centered on the axis 3 protrudes from the base 22 in the opposite direction with respect to the protrusion 26, in order to form a wall for supporting an O-ring gasket 28 and form a portion of the extraction or infusion chamber of the assembly 20.

In order to accommodate the gasket 28, an annular seat 29 is preferably provided on the external surface of the wall 27.

The internal surface of the wall 27 is instead shaped so as to form, together with the base 22, a seat for a mesh filter (which is described hereinafter). In the region comprised within the wall 27, the base 22 is provided with a flat recess 31, which forms an interspace of minimal dimensions for distributing the hot water onto the coffee pod 16 which is present on the filter holder 1.

The internal cavity of the protrusion 26 comprises a nozzle 32 for distributing hot water in the extraction chamber delimited by the base 22, the wall 27 and the receptacle of the adapter 8 which contains the coffee pod 16. The nozzle 32 is fixed in the cavity of the protrusion 26, for example by threading or interlocking, and comprises preferably an axial through duct, which ends with two or more ducts 37 having a much smaller cross-section, which are adapted to dispense the hot water injected through the injector 30 and the axial duct of the nozzle 32 in the extraction chamber, at said flat recess 31.

A circular mesh filter 33 is fitted slidingly within the axial cavity of the nozzle 32 by means of a pin 38, which is provided in the center of the mesh filter 33. The pin 38 has a radial protrusion which can engage a respective abutment provided in the axial cavity of the nozzle 32, in order to block the stroke of the mesh filter 33 in a downward direction.

A first helical spring 34, which is coaxial to the nozzle 32, is arranged outside the end part of the nozzle, between the base 22 of the bell-shaped element 21 and the mesh filter 33, in order to load the mesh filter downwardly, i.e., on the upper surface of the pod 16. Downward loading of the mesh filter 33 allows to keep the pod 16 inside the receptacle formed by the adapter 8 of the filter holder, thus preventing the pod from remaining accidentally attached to the extraction assembly 20 during disengagement of the filter holder 1 when beverage extraction ends.

The nozzle 32 comprises a second helical spring 35, which is arranged inside the through duct and on one end of which a mushroom valve 36 is inserted which interacts with the end part of the injector 30, in order to adjust the stream of hot water that arrives from the injector and avoid dripping water at the end of the extraction.

Operation of the extraction assembly thus conceived is as follows. A filter holder according to the invention is engaged to the ring 24 by turning it counterclockwise, so that the protrusions 7 of the cup 2 rest on the lower guide 25 of the ring 24. During rotation, the cup 2 moves gradually toward the base of the bell-shaped element 21 of the extraction assembly. After a rotation through approximately 45°, the filter holder is already in a position which is adapted to withstand the pressure that occurs during extraction, the mesh filter 33 rests against the upper surface of the pod 16 arranged in the adapter 8, and the device is ready for the extraction of a weak coffee (FIG. 2). The injection of pressurized hot water by the injector 30 entails lowering the mushroom valve 36 and the passage of water through the nozzle 32. The water then enters the extraction chamber by passing in the interspace formed between the base 22 of the bell-shaped element 21 of the extraction assembly and the mesh filter 33. Since the mesh filter is relatively distant from the base 22, the coffee cake has a larger volume available for the expansion produced by contact with the hot water and therefore has a lower hydraulic resistance, which is low enough to allow light percolation, which is ideal for preparing a so-called "lungo" or weak coffee.

As a consequence of a further rotation through approximately 70°, the mesh filter 33 is pushed upwardly until it makes contact with the base 22 (FIG. 3). At this point, the coffee cake is more compressed and has a smaller volume available with respect to the expansion produced by contact with the hot water, and therefore has a high hydraulic resistance which reduces the flow of the liquid within said cake. Accordingly, percolation becomes slower, extraction of the beverage becomes more intense, and the coffee that is produced is of the so-called "ristretto" or strong type.

As can be seen, the provision of an adapter 8 which can rotate freely in the cup 2 of the filter holder 1 allows to uncouple the rotation of the cup 2 from friction against the gasket 28, during operations for engaging and disengaging the filter holder 1 with respect to the extraction assembly 20 and during the adjustment of the type of extraction.

With reference to FIGS. 1 to 3, when the filter holder is inserted in the ring 24, the internal surface of the adapter 8 in fact makes contact with the gasket 28, and as a consequence of friction the adapter 8 remains substantially motionless in a tangential direction and engaged with the gasket 28, regardless of rotation in the direction for engagement (counterclockwise) of the filter holder. The same occurs for disengagement of the filter holder (clockwise).

It has been found experimentally that the relative slippage between the gasket 28 and the internal surface of the adapter 8 amounts to only 2 mm in a full rotation from the position of FIG. 1 to the position of FIG. 3, i.e., slippage is reduced by approximately 90% with respect to known systems which use a gasket of the radial type which acts on the internal surface of a filter holder. The wear of the gasket 28 is therefore reduced drastically with respect to known systems. A further additional reduction of the wear of the gasket is achieved by way of the reduced roughness of the internal face of the adapter 8 made of molded plastics with respect to the internal face of the metallic filter holder.

Figure 7:
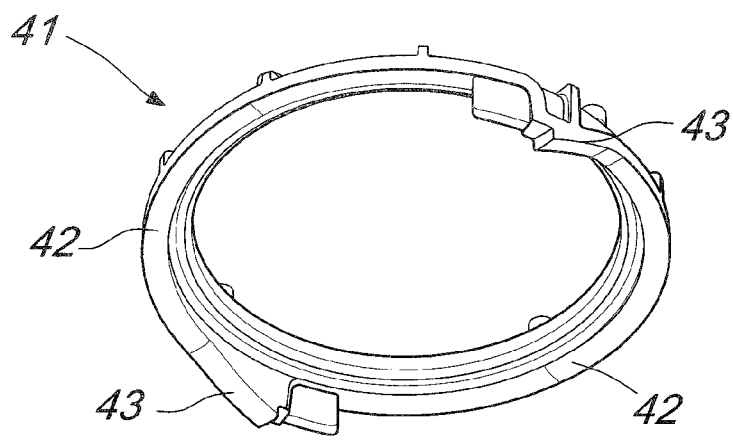
FIG. 7 is a perspective view of the complementary ring used in the extraction assembly of FIGS. 1-3.

Advantageously, the extraction assembly also has a complementary ring 41, which is preferably interlocked within the bell-shaped element 21 so as to face the lower guide 25 formed in the ring 24. The complementary ring 41, shown in FIG. 7, is circular and comprises a surface 42 with two ramps 43, which forms an upper guide for the protrusions 7 of the filter holder 1.

With reference to FIG. 1, the complementary ring 41 is fitted in the extraction assembly 20 so that the ramps 43 are directed downwardly and are positioned substantially at the access points for the protrusions 7 provided on the ring 24. The longitudinal direction of the ramps is such as to facilitate the downward movement of the filter holder 1 during the disengagement movement thereof. Therefore, the complementary ring 41 facilities considerably the removal of the filter holder from the extraction assembly, facilitating the separation of the surfaces and of the components which, during the step of extraction of the beverage, are in direct contact and may accidentally remain attached.

In practice it has been found that the device according to the invention fully achieves the intended aim and objects, since it allows to uncouple the relative movement between the internal components of the extraction assembly and the filter holder, thus reducing the main causes of wear due to friction.

The provision of a removable adapter also allows to remove the adapter from the filter holder in order to clean it or replace the lower filter.

Moreover, the material of the adapter can be chosen independently of the material of the external enclosure of the filter holder, allowing for example to select the material so as to reduce the transmission of heat from the extraction assembly to the filter holder.

Although the device according to the invention has been conceived in particular for espresso coffee machines, it can in any case be used more generally for machines suitable for extracting beverages from edible substances in particulate form, in which the substance (loose or contained, for example, in a pod or rigid cartridge) is arranged on a filter holder which must be inserted in an extraction assembly with a rotary motion.

The device thus conceived is susceptible of numerous modifications and variations, all of which are within the scope of the appended claims; all the details may further be replaced with other technically equivalent elements.

In practice, the materials used, as well as the dimensions, may be any according to requirements and to the state of the art.

The disclosures in Italian Patent Application No. MI2005A000787 from which this application claims priority are incorporated herein by reference.

What is claimed is:

1. A filter holder particularly for espresso coffee machines, comprising:
    a cup-shaped body which has a substantially cylindrical shape with respect to a central axis of said cup-shaped body, said cup-shaped body having a side wall and a bottom, and said cup-shaped body being open in an upward region for fitting on an espresso coffee machine and having an opening in said bottom which is arranged on said central axis of said cup-shaped body for the passage of an extracted beverage; and
    an adapter which is fitted and arranged inside said side wall of said cup-shaped body, said adapter being cylindrical and comprising a base and a side wall which form an extraction chamber adapted to accommodate a substance in powder form from which a beverage is to be extracted, said base of said adapter being supported above said bottom of said cup-shaped body, and said adapter being fixed to said cup-shaped body such that said adapter is able to freely rotate coaxially with respect to said cup-shaped body,
    said adapter being fixed to said cup-shaped body inside the cup-shaped body such as to be adapted to prevent an axial movement of said adapter in a direction toward said upward region of said cup-shaped body and away from said bottom of said cup-shaped body, such that said axial movement of said adapter is blocked and simultaneously said adapter is free to rotate coaxially with respect to said cup-shaped body, and
    said side wall of said adapter having a height sufficient to form an internal surface of said adapter that is adapted to sealingly engage a gasket of an extraction assembly to form said extraction chamber.

2. The filter holder according to claim 1, wherein said side wall of said adapter forms an upper opening for watertight fitting on said extraction assembly and a beverage conveyance element protrudes from said base of said adapter, said conveyance element being coaxial with respect to said central axis and passes through said opening on the bottom of said cup-shaped body.

3. The filter holder according to claim 1, wherein said adapter can be disengaged manually from said cup-shaped body in order to remove said adapter from said cup-shaped body.

4. The filter holder according to claim 2, wherein said adapter is snap-fit to said cup-shaped body.

5. The filter holder according to claim 4, wherein said adapter includes at least one tab, which is arranged externally on said conveyance element for snap engagement with the edge of the bottom opening of said cup-shaped body.

6. The filter holder according to claim 5, further comprising a circular groove, which is arranged around the edge of the bottom opening of said cup-shaped body and within which a free end of said tab engages so as to slide within said groove during a rotation of said adapter about its own axis.

7. The filter holder according to claim 1, wherein said adapter is adapted to contain completely a prepackaged dose of ground roasted coffee.

8. An assembly for extracting a beverage from a substance in particulate form, comprising:
    a bell-shaped element, which has a base and a side wall which lies around an axis for fitting on a beverage extraction machine;
    a ring, which is fitted coaxially and externally with respect to said bell-shaped element;
    a filter holder according to claim 1, wherein said cup-shaped body of said filter holder is fitted removably on said ring according to a bayonet coupling by means of outwardly extending protrussions of said side wall of said cup-shaped body in order to form an extraction chamber together with at least one portion of the base of said bell-shaped element, the height of said extraction chamber being adjustable according to the angular position of said filter holder about said axis, said extraction chamber comprising a gasket which removably sealingly engages an inner surface of the adapter of said filter holder during the steps for fitting and removing the filter holder with respect to said ring.

9. The extraction assembly according to claim 8, wherein the base of said bell-shaped element comprises a hollow axial protrusion, which is directed substantially toward the inside of said bell-shaped element and is adapted to engage in an upward region a hot water injector of a machine for extracting beverages, the internal cavity of said protrusion comprising a nozzle for distributing the hot water in said extraction chamber, said base of said bell-shaped element being coupled elastically to an upper filter of said extraction chamber, said filter being able to move axially.

10. The extraction assembly according to claim 8, further comprising a complementary ring, which forms an upper guide for said bayonet coupling, said upper guide being adapted to guide downwardly the movement of the filter holder during the removal in a rotary direction of the filter holder from the ring.

11. A filter holder particularly for espresso coffee machines, comprising:
    a cup-shaped body which has a substantially cylindrical shape with respect to a central axis of said cup-shaped body, said cup-shaped body having a side wall and a bottom, and said cup-shaped body being open in an upward region for fitting on an espresso coffee machine and having an opening in said bottom which is arranged on said central axis of said cup-shaped body for the passage of an extracted beverage; and an adapter which is fitted in said cup-shaped body and is cylindrical in order to form an extraction chamber adapted to accommodate a substance in powder form from which a beverage is to be extracted, said adapter being fixed to said cup-shaped body such that said adapter is able to freely rotate coaxially with respect to said cup-shaped body, said adapter being fixed to the cup-shaped body such as to be adapted to prevent an axial movement of said adapter in a direction toward said upward region of said cup-shaped body and away from said bottom of said cup-shaped body, such that said axial movement of said adapter is blocked and simultaneously said adapter is free to rotate coaxially with respect to said cup-shaped body; and wherein said adapter comprises a side wall which forms an upper opening for watertight fitting on an extraction assembly and comprises a base from which a beverage conveyance element protrudes which is coaxial with respect to said central axis and passes through said opening on the bottom of said cup-shaped body, and said side wall of said adapter having a height sufficient to form an internal surface of said adapter that is adapted to sealingly engage a gasket of said extraction assembly to form said extraction chamber.

12. The filter holder according to claim 11, wherein said adapter can be disengaged manually from said cup-shaped body in order to remove said adapter from said cup-shaped body.

13. The filter holder according to claim 11, wherein said adapter is snap-fit to said cup-shaped body.

14. The filter holder according to claim 13, wherein said adapter includes at least one tab, which is arranged externally on said convenance element for snap engagement with the edge of the bottom opening of said cup-shaped body.

15. The filter holder according to claim 14, further comprising a circular groove which is arranged around the edge of the bottom opening of said cup-shaped body and within which a free end of said tab engages so as to slide within said groove during a rotation of said adapter about its own axis.

16. The filter holder according to claim 11, wherein said adapter is adapted to contain completely a prepackaged dose of ground roasted coffee.

* * * * *